(12) United States Patent
Kernig et al.

(10) Patent No.: US 10,889,912 B2
(45) Date of Patent: Jan. 12, 2021

(54) ALUMINIUM ALLOY STRIP FOR ADHESIVE CONNECTION

(71) Applicants: Bernhard Kernig, Cologne (DE); Henk-Jan Brinkman, Bonn (DE); Kathrin Eckhard, Alfter (DE); Gernot Nitzsche, Meckenheim (DE); Frank Hirschmann, Nettetal (DE)

(72) Inventors: Bernhard Kernig, Cologne (DE); Henk-Jan Brinkman, Bonn (DE); Kathrin Eckhard, Alfter (DE); Gernot Nitzsche, Meckenheim (DE); Frank Hirschmann, Nettetal (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 0 days.

(21) Appl. No.: 16/046,575

(22) Filed: Jul. 26, 2018

(65) Prior Publication Data
US 2018/0347067 A1 Dec. 6, 2018

Related U.S. Application Data

(63) Continuation of application No. PCT/EP2017/051526, filed on Jan. 25, 2017.

(30) Foreign Application Priority Data

Jan. 27, 2016 (EP) ..................... 16152890

(51) Int. Cl.
*C25F 3/04* (2006.01)
*B32B 15/20* (2006.01)
(Continued)

(52) U.S. Cl.
CPC .................. *C25F 3/04* (2013.01); *B32B 7/12* (2013.01); *B32B 15/20* (2013.01); *C22C 21/00* (2013.01);
(Continued)

(58) Field of Classification Search
CPC ... C25F 3/04; B32B 7/12; B23B 15/20; C22C 21/00; C22C 21/02; C22C 21/08; C22C 21/10
See application file for complete search history.

(56) References Cited

U.S. PATENT DOCUMENTS 5,380,976 A * 1/1995 Couch, Jr. .............. B23K 10/00
219/121.44
5,755,949 A * 5/1998 Amor ..................... B41N 3/034
205/153
(Continued)

FOREIGN PATENT DOCUMENTS

CN 101835610 A 9/2010
CN 102424905 A 4/2012
(Continued)

*Primary Examiner* — Daniel J. Schleis
*Assistant Examiner* — Kevin C T Li
(74) *Attorney, Agent, or Firm* — Reinhart Boerner Van Deuren P.C.

(57) ABSTRACT

The invention relates to a strip consisting of an aluminium alloy for providing adhesive connections. In addition, the invention relates to a method for producing a strip having a one or two-sided surface structure which consists of an aluminium alloy, at least provided in certain areas and prepared for an adhesive connection, and also relates to a corresponding adhesive connection. The object of providing an aluminium alloy strip optimised for adhesive connections, which has optimised surface properties for ageing-resistant adhesive connections, on the one hand, and which can be cost-effectively produced in a way which is reliable in terms of the process, on the other hand, is achieved for a strip consisting of an aluminium alloy for providing adhesive connections by the strip at least in areas having a surface structure prepared for adhesive connections, wherein the surface structure has depressions which were produced using an electrochemical graining process.

28 Claims, 7 Drawing Sheets

(51) Int. Cl.
*B32B 7/12* (2006.01)
*C22C 21/08* (2006.01)
*C22C 21/02* (2006.01)
*C22C 21/10* (2006.01)
*C25F 7/00* (2006.01)
*C25F 1/00* (2006.01)
*C22C 21/00* (2006.01)

(52) U.S. Cl.
CPC .............. *C22C 21/02* (2013.01); *C22C 21/08* (2013.01); *C22C 21/10* (2013.01); *C25F 1/00* (2013.01); *C25F 7/00* (2013.01)

(56) References Cited

U.S. PATENT DOCUMENTS

| | | | | |
|---|---|---|---|---|
| 6,165,630 | A | * | 12/2000 | Gehlhaar ................. C25D 5/44 205/103 |
| 2002/0029709 | A1 | * | 3/2002 | Sawada ................... B41N 1/083 101/453 |
| 2005/0205167 | A1 | | 9/2005 | Benmalek |
| 2008/0102404 | A1 | * | 5/2008 | Tashiro ................... B41N 1/083 430/278.1 |

FOREIGN PATENT DOCUMENTS

| | | |
|---|---|---|
| CN | 108603304 A | 9/2018 |
| JP | 2-58295 A | 2/1990 |
| JP | 7-224400 A | 8/1995 |
| JP | 09-304938 A | 11/1997 |
| JP | 2002-019311 A | 1/2002 |
| JP | 2002-120002 A | 4/2002 |
| JP | 2005-502781 T | 1/2005 |
| JP | 2008-111142 A | 5/2008 |
| JP | 2015-53240 A | 3/2015 |
| JP | 2019-508585 A | 3/2019 |

* cited by examiner

ALUMINIUM ALLOY STRIP FOR ADHESIVE CONNECTION

CROSS-REFERENCE TO RELATED PATENT APPLICATIONS

This patent application is a continuation of PCT Application No. PCT/EP2017/051526, filed Jan. 25, 2017, which claims priority to European Application No. 16152890.6, filed Jan. 27, 2016, the entire teachings and disclosure of which are incorporated herein by reference thereto.

FIELD OF THE INVENTION

The invention relates to a strip consisting of an aluminium alloy and its use for providing adhesive connections, in particular adhesive connections in motor vehicles. In addition, the invention relates to a method for producing a strip, having a one or two-sided surface structure which is at least provided in certain areas, consists of an aluminium alloy and is prepared for an adhesive connection, and also relates to a corresponding adhesive connection.

BACKGROUND OF THE INVENTION

In the automotive industry, sheets consisting of aluminium alloys are increasingly being used to realize weight-saving potentials in automotive engineering. Strips and sheets for producing motor vehicle components are usually produced from aluminium alloys of the type AA7xxx, type AA6xxx, of the type AA5xxx or of the type AA3xxx. They are characterised by their medium to very high strengths and very good forming behaviour. Up to now, sheets consisting of aluminium alloys for motor vehicles have been mechanically provided with a fine surface structure by impressing a special roll topography in the last cold-rolling pass, in order to positively influence the friction behaviour in the subsequent forming process.

In order to use sheets consisting of an aluminium alloy in automotive engineering, these sheets must be joined to other components, preferably joined in a materially bonded manner. Welding, soldering and also adhesive connections particularly come into consideration as the joining technique. The use of adhesive connections has decisively advanced the use of aluminium alloys in automotive engineering, since material bonds can be provided between aluminium alloys and different materials without any great problems. It is also advantageous that adhesive connections do not usually require any high temperatures for hardening the adhesive connections and therefore with naturally hard aluminium materials no softening processes in the aluminium are associated with providing adhesive connections. The advantage of precipitation hardening aluminium materials lies in the fact that during the thermal hardening of the adhesive the strength in the material increases. In a paint baking step, the adhesive hardens and the strength in the material increases. The bond is provided by a thin adhesive layer which after hardening possesses adhesion and cohesion properties. The adhesion determines the strength of the bond between the adhesive and the metal, i.e. at the interfacial layer to the metal, while the cohesion describes the bonding forces between the individual molecules of the adhesive itself. In order to realise the potential of the adhesive in relation to the achievable holding force of adhesive connections, the aim is for the adhesion forces, i.e. the forces between the adhesive and the metal surface, to be greater than the cohesion forces of the adhesive itself. However, the adhesion forces are dependent on the metal surface. Therefore, for the adhesion of aluminium alloys, the surface preparation of the area, for example of an aluminium alloy strip, having the adhesive connection plays a key role.

In addition, of course, the choice of the adhesive also with an optimum surface preparation determines the properties of the subsequent adhesive connection. These properties can be selected specific to the application. There are chemically hardening adhesives which harden by polymerisation, polyaddition or polycondensation, and physically hardening adhesives, such as hot melt adhesives, dispersion adhesives, solvent borne adhesives, contact adhesives or pressure sensitive adhesives. For example, epoxide adhesives, epoxide/polyimide blends, polyurethane adhesives, acrylate adhesives, phenol resins or silane modified polymers are used. The materials to be bonded, the area of application, environmental conditions, the amount and type of the possible stress, the rigidity of the joining parts, the overlap length of the adhesive connection and the required production processes should be taken into account when selecting the adhesive. For example, structural adhesives, anti-flutter adhesives or adhesives for joint sealing are differentiated.

The ageing resistance of adhesive connections is dependent on the surface treatment of the aluminium alloy strips. The problem with aluminium alloy strip surfaces which are untreated, apart from impressing a surface structure, is that they usually have an inert oxide layer, which has been contaminated by the previous processing steps. Although an adhesive can wet this untreated surface and form a bond with it, moisture penetrating the adhesive causes oxides to be released from the surface of the untreated aluminium alloy sheet and are no longer available for providing adhesion forces at this place. Hence, overall, the strength of the adhesive connection slowly diminishes, particularly with weathering, i.e. under the effect of moisture and/or corrosive substances.

Up to now, pickling processes for example have been used in order to remove the contaminated upper layer of the aluminium alloy sheet and, at the same time, in order to modify the surface for example by means of corresponding pickling compounds in the sense of a conversion layer. Alternatively, a conversion layer can also be produced by chromating. Preferably, nowadays however, conversion layers produced free from chromium, for example conversion layers based on Ti/Zr, are applied for providing an optimum adhesive surface. A further method for providing a pre-treated surface of an aluminium alloy sheet is also known, in which a thin, anodised layer is produced on the strip or sheet which is to improve the adhesive properties and the fatigue endurance limit of the adhesive connection. This type of thin-layer anodisation can also be used as a primer for paint. It is carried out, for example, in phosphoric acid, in mixtures of sulphuric acid and phosphoric acid or in hot sulphuric acid.

Both methods are an additional method step which has to be applied to the sheet or strip in addition to providing surface properties, which are to improve the formability, and therefore generates costs.

An electrochemical graining of an aluminium surface for the production of lithographic printing plate supports for roughening the surfaces is known from the US patent application US 2008/0102404 A1. The electrochemical graining, in contrast to electrochemical etching which uses direct current, takes place using alternating current or pulsed direct current. This ensures that the etching process is repeatedly interrupted, and the surface is not etched deeply, for example with deep channels, but only superficial valleys are produced, i.e. a graining or roughening of the surface is obtained.

Taking this as the starting point, the invention is based on the object of providing an aluminium alloy strip optimised for adhesive connections, which has optimised surface properties for ageing-resistant adhesive connections, on the one hand, and which can be cost-effectively produced in a process-reliable manner, on the other hand. At the same time, a method for producing a strip or sheet consisting of an aluminium alloy and an ageing-resistant adhesive connection shall be specified.

BRIEF SUMMARY OF THE INVENTION

According to a first teaching of the present invention, the object is achieved for a strip consisting of an aluminium alloy for providing adhesive connections by the strip at least in certain areas having a surface structure prepared for adhesive connections, wherein the surface structure has depressions which were produced using an electrochemical graining process.

Examinations of surface structures on aluminium alloy strips produced by an electrochemical graining process have shown that due to the electrochemically roughened surface not only the holding force between the adhesive and the strip can be increased, but also the ageing resistance of the adhesive connection can be considerably improved, so that additional production steps can be dispensed with. At the same time, the electrochemically grained surface also provides improved forming properties, since the depressions on the surface of the aluminium alloy strip can serve as lubricant pockets which considerably improve the forming behaviour of the sheet, i.e. positively influence the tribological properties of the sheet. In addition, the surface of the aluminium alloy strip can, for example, have the plateau-like texture formed during rolling of the final rolling steps, which is accomplished with depressions introduced into the surface using the electrochemical graining. The depressions introduced into the aluminium alloy strips during the electrochemical graining have, compared to the mechanical impressing methods, large, closed individual void volumes, a higher enclosed total void volume resulting from this and hence a distinctly greater reduced valley depth. In addition to the surface structure previously introduced by the rolling, for example a "mill-finish" surface structure, the surface has depressions which to some extent fall away very abruptly from the surface and have undercuts or negative opening angles. This arrangement of the depressions can be specifically attributed to the production process by electrochemical graining. Therefore, the surface also clearly differs from the strip surfaces produced by anodisation or thin-layer anodisation. In contrast to the epitaxial growth of a thin anodised oxide film, according to the invention metal is removed from the surface of the aluminium alloy strip. Finally, electrochemical graining is a method which is applicable economically on an industrial scale and is therefore suitable for mass production.

Preferably, the strip or sheet consisting of an aluminium alloy has a minimum thickness of 0.8 mm. Aluminium alloy strips having a thickness of at least 0.8 mm are often used in automotive engineering and are subjected to a forming process, for example deep drawing, in order, for example, to bring a flat sheet into a specific shape required for the application. Subsequently, the formed sheet is adhesively connected to other components. It is also conceivable for the adhesive connection to be already created before the forming takes place and for the sheet to be formed together with the component. In addition, preferred thicknesses in the automotive industry are also 1.0 to 1.5 mm or up to 2.0 mm. Aluminium sheets having thicknesses up to 3 mm or up to 4 mm are also formed in forming processes and used in the automotive industry, for example in chassis applications or as structural parts.

According to a further embodiment, the strip or sheet at least partly consists of an aluminium alloy of the type AA7xxx, type AA6xxx, of the type AA5xxx or of the type AA3xxx, in particular consists of an aluminium alloy of the type AA7020, AA7021, AA7108, AA6111, AA6060, AA6016, AA6014, AA6005C, AA6451, AA5454, AA5754, AA5251, AA5182, AA3103 or AA3104. In addition, an AlMg6 alloy can preferably also be used for the strip or sheet. Finally, the use of clad composite materials is also conceivable with the above-named alloys, for example as a core alloy. For example, a core alloy of the type AA6016 or AA6060 clad with an AA8079 aluminium alloy already has very good forming properties without the surface treatment by electrochemical graining. It is assumed that these properties can be additionally improved by means of the surface texture according to the invention and furthermore that a higher ageing resistance of the adhesive connection can be achieved. It is common to the named aluminium alloys that they are usually preferred for use in motor vehicles. They are characterised by a high forming capacity and providing medium to very high strengths. For example, the aluminium alloys of the type AA6xxx or AA7xxx can achieve very high strengths by means of a precipitation hardening after the forming and are used in structural applications. They are therefore also usually adhesively connected with high-strength adhesives, so that with adhesive connections of these alloy types there should be a very high level of adhesion between the adhesive and the metal surface. The strip according to the invention can provide this. The aluminium alloys with a high magnesium content of the type AA5xxx and AlMg6 mentioned are not precipitation hardening, but have, in addition to a very good forming behaviour, even without precipitation hardening very high strength values, so that they are used in structural applications in the motor vehicle like the alloy types AA6xxx and AA7xxx. The alloys of the type AA3xxx provide medium strengths and are preferably used for components in which the rigidity has priority and a high deformability is required. In addition, all aluminium alloys mentioned can be used for adhesive connections, wherein due to the lower magnesium contents the aluminium alloys of the type AA6xxx often provide higher strengths for the adhesive connection compared to the aluminium alloy of the type AA5xxx. However, alloys of the type AA5xxx and of the type AA6xxx both show the improvement in the ageing resistance as a result of the surface structure according to the invention. It is expected that this also applies for the alloys of the type AA7xxx and AA3xxx.

According to a further embodiment, preferably the strip is designed for producing sheets for motor vehicles, in particular for producing sheets for structural applications of motor vehicles. In the case of motor vehicles, and particularly in the structural applications of the motor vehicle, high requirements are put on the adhesion between the adhesive and the metal surface, since the adhesive connections are usually provided with high-strength adhesives.

As already stated, the electrochemical graining process results in a quite specific surface topography, i.e. specifically distinctive depressions which can also serve as lubricant pockets. To describe the specifically developed surface topography, the reduced peak height $S_{pk}$, the core roughness depth $S_k$ and the reduced valley depth (also called the reduced groove depth) $S_{vk}$ are available for areal measurement of roughness according to EN ISO 25178.

All three named parameters can be read according to EN ISO 25178 from a so-called Abbott curve. A surface is usually optically measured three-dimensionally in order to obtain the Abbott curve. Flat areas, which extend parallel to the measured surface, are introduced at a height c into the measured three-dimensional height profile of the surface, wherein c is preferably determined as the distance from the zero position of the measured surface. The area of the intersecting plane of the introduced flat areas with the measured surface is determined at the height c and divided by the whole measurement area, in order to obtain the area ratio of the intersecting plane on the whole measurement area. This area ratio is determined for different heights c. The intersecting plane height is then represented as a function of the area ratio, from which the Abbott curve results, FIG. 1.

The reduced peak height ($S_{pk}$), the core roughness depth ($S_k$) and the reduced valley depth ($S_{vk}$) can be determined by means of the Abbott curve. All three parameters refer to different surface properties. It has been established that in particular the reduced valley depth ($S_{vk}$) correlates with an improved forming behaviour.

The Abbott curve usually has an S-shaped course for rolled surfaces. A secant having a length of 40% of the material ratio is moved into this S-shaped course of the Abbott curve until it has a minimum slope value. This is usually the case at the inflection point of the Abbott curve. The extension of this straight line up to a 0% material and 100% material ratio in turn results in two values for the height c at a 0% and 100% material ratio. The vertical distance between the two points results in the core roughness depth $S_k$ of the profile. The reduced valley depth $S_{vk}$ results from a triangle $A_2$ having an area equal to the valley areas of the Abbott curve with a base length of 100%–Smr2, wherein Smr2 results from the intersection point of the Abbott curve with a parallel to the X axis which runs through the intersection point of the extension of the secant with the 100% abscissa. The height of this triangle of equal area corresponds with an area measurement to the reduced valley depth $S_{vk}$, FIG. 1.

The reduced peak height $S_p k$ is the height of the triangle having an area equal to the crest areas of the Abbott curve with the base length Smr1. Smr1 results from the intersection point of the Abbott curve with a parallel to the X axis which runs through the intersection point of the extension of the above-mentioned secant with the 0% axis.

With an area measurement the parameters $S_k$, $S_{pk}$ and $S_{vk}$ enable the profile to be considered separately in terms of the core area, peak area and groove area or valley area.

The valley density of the texture $n_{clm}$ can also be used as a further parameter of the surface. The valley density specifies the maximum number of closed void volumes, i.e. depressions or valleys dependent on the measurement height c per mm². The measurement height c corresponds to the value c which is also represented in the Abbott curve. Hence, the measurement height c corresponds at 100% to the highest elevation of the surface and at 0% to the lowest point of the surface profile.

The following applies:
$n_{cl}$ I=number of closed void areas per unit area (1/mm²) at a given measurement height c (%) and
$n_{clm}$=MAX($n_{cl}(c_i)$), wherein $n_{clm}$ corresponds to the maximum number of closed void areas per unit area (1/mm²) with $c_i$=0 to 100%.

Finally, the closed void volume $V_{vcl}$ of the surface also serves to characterise the surface. It determines the absorbability of the surface, for example for lubricants. The closed void volume is determined by determining the closed void area $A_{vcl}$I dependent on the measurement height c. The closed void volume $V_{vcl}$ then results from:

$$V_{vcl} = \int_0^{100\%} A_{vcl}(c)dc$$

The surface can also be described by means of the skewness of the topography of the surface $S_{sk}$. This specifies whether the measured surface has a plateau-like structure with depressions or a surface marked by elevations or peaks. According to DIN EN ISO 25178-2, the $S_{sk}$ is the quotient of the mean third power of the ordinate values and of the third power of the mean quadratic height $S_q$. The following applies:

$$S_{sk} = \frac{1}{S_q^3}\left(\frac{1}{A}\int\int_A z^3(x,y)dxdy\right),$$

wherein A is the limited surface part of the measurement and z is the height of the measurement point. For $S_q$ the following applies:

$$S_q = \sqrt{\frac{1}{A}\int\int_A z^2(x,y)dxdy}.$$

If $S_{sk}$ is less than zero, then there is a plateau-like surface shaped by depressions. If the value for $S_{sk}$ is greater than zero, then the surface is marked by peaks and has no or only a very small plateau-like surface proportion.

According to the invention, the surface structure which is at least provided in certain areas is provided on at least one or on both sides of the strip and has a reduced valley depth $S_{vk}$ of 1.0 µm to 6.0 µm, preferably 1.5 µm to 4.0 µm, particularly preferably 2.2 µm to 4.0 µm. With a reduced valley depth of 1.0 µm to 6.0 µm, a reduced valley depth $S_{vk}$ can be provided on the strip according to the invention consisting of an aluminium alloy which is greater by at least a factor of 4 than with surface structures which are conventionally embossed by rolling. The preferably selected values for the reduced valley depth enable an improved forming behaviour to be obtained without affecting the subsequent surface properties, for example the surface appearance after painting. At the same time, adhesive connections on areas of the strips having corresponding surface structures showed improved strengths in the original state and after weathering, i.e. after artificial ageing. The weathering was carried out by a salt spray test according to DIN EN ISO 9227 for 500 hours and the strength of the adhesive connection was determined in the shear tension test described in more detail later.

Preferably, according to a further embodiment of the strip according to the invention, the closed void volume $V_{vcl}$ is at least 450 mm³/m², preferably at least 500 mm³/m². 1000 mm³/m² or 800 mm³/m² can be regarded as a practical upper limit. However, values above 1000 mm³/m² are also conceivable. The increase in the closed void volume also provides a larger surface per unit area of the strip, so that higher holding forces between the adhesive and the strip or a sheet produced from it are obtained compared to the ungrained surface. In addition, the strip surface according to the invention can provide considerably more lubricant for the forming process than the conventional surfaces used up to now.

According to a further embodiment, the aluminium alloy strip according to the invention has a valley density $n_{clm}$, of the surface which is increased by at least 25% compared to conventionally produced surface textures, for example EDT textures. The valley density of the surface is preferably more than 80 to 180 valleys per $mm^2$, preferably 100 to 150 valleys per $mm^2$.

A further embodiment of the aluminium alloy strip has a skewness of the topography of the surface $S_{sk}$ of 0 to −8, preferably −1 to −8. A plateau-like structure of the surface can hereby be obtained, which is provided with depressions, so that lubricant pockets are made available. This surface topography, particularly with a skewness of −1 to −8, is obtained for example by electrochemically graining a "mill finish" roll surface and has a preferred forming behaviour.

According to a further embodiment of the strip or sheet according to the invention, it has the state soft-annealed ("0") or solution-annealed and quenched ("T4"). Both states have a maximum forming capacity and enable, in conjunction with the novel surface structure of the strip or sheet, the forming capacity to be increased. While the state "0" is provided by every material, precipitation hardening materials, for example AA6xxx or AA7xxx alloys, are solution-annealed and subsequently quenched. This state is referred to as T4. Generally, however, both states are preferably provided for forming processes, since in this state the sheet or the strip allows maximum deformation degrees irrespective of the respective material. In the T4 state, additionally an increase in the strength is made possible by precipitation hardening. T4 is a preferred state for the strip consisting of an aluminium alloy for providing adhesive connections because the adhesive connections are usually required and carried out after the forming when the sheets are being assembled, for example to form a longitudinal chassis beam or a B-pillar of a motor vehicle. The thermal hardening of the adhesive, which preferably can take place at the same time as the paint baking, converts the precipitation hardening aluminium alloys into the state T6, which due to its higher strength is the preferred state of the aluminium when used in the vehicle.

According to a further embodiment, the strip optionally has a passivation layer which is applied after the electrochemical graining. This passivation layer usually consists of conversion materials which are free from chromium and which protect the surface of the aluminium strip against corrosion and provide an optimum primer for subsequent processes. Therefore, the conversion layer represents a specific passivation layer. Although the passivation layer on the basis of the method for producing the surface structure according to the invention is optional, the conversion layer additionally improves the ageing resistance of the surface of the aluminium alloy strip according to the invention. The passivation applied after the electrochemical graining also does not affect the provision of lubricant pockets for the forming process of the strip or sheet, so that passivated strips can also be formed well.

According to a further embodiment, the strip at least in certain areas has a forming aid on the surface, in particular a dry-film lubricant, which can serve as a protective layer during transport, storing and handling and as a lubricant in subsequent forming processes. A product which is particularly suitable for storage can hereby be provided which, at the same time, is also easy to handle due to the protective layer.

According to a further embodiment of the aluminium alloy strip, the average roughness $S_a$ of the surface of the strip is 0.5 µm to 2.0 µm, preferably 0.7 µm to 1.5 µm, particularly preferably 0.7 µm to 1.3 µm or preferably 0.8 µm to 1.2 µm. Strips for inner parts of a motor vehicle or structural applications preferably have an average roughness $S_a$ of 0.7 µm to 1.3 µm and outer skin panels of a motor vehicle have an average roughness $S_a$ of 0.8 µm to 1.2 µm. Outer and inner parts of a motor vehicle obtain then a very good surface appearance and are particularly well suited for painting.

The above established object is also achieved by a sheet which is produced from an aluminium alloy strip according to the invention by cutting the strip to size. These sheets are preferably subjected to forming processes and subsequently as a formed sheet bonded to other components, for example components of a motor vehicle, by means of an adhesive connection. When adhesively connecting, epoxide adhesives, epoxide/polyimide blends, polyurethane adhesives, acrylate adhesives, phenol resins or silane modified polymers are used depending on the respective application and the required properties of the adhesive connection.

, According to a second teaching of the present invention, the above indicated object is achieved for a method for producing an aluminium alloy strip by a hot- and/or cold-rolled strip or sheet consisting of an aluminium alloy being subjected to electrochemical graining on one or on both sides after the rolling, wherein homogenously distributed depressions are introduced into the strip or sheet consisting of an aluminium alloy by the electrochemical graining.

The aluminium alloy strips or sheets produced in this way have specific surfaces. The rolled-in texture of the strip or sheet is retained with the exception of the additionally introduced depressions which were introduced by the electrochemical graining. With a "mill finish" surface for example, the rolled texture forms a plateau-like surface in which homogenously distributed depressions are present. Hence, the aluminium alloy strip or sheet produced according to the invention differs distinctly from conventionally produced aluminium strips and sheets whose texture is not formed in a plateau-like manner due to the texture embossing by rolling.

Preferably, the strip or sheet is subjected to a forming process, for example deep drawing. The deep drawing usually, in practice, comprises deep drawing and stretch drawing parts. For this purpose, the aluminium alloy strip or sheet can be coated with a forming aid beforehand, for example with a lubricant or dry-am lubricant, so that by means of the lubricant present in the depressions of the surface, which then serve as lubricant pockets, a better forming behaviour is obtained due to the optimised surface structure and the better lubricant coating. The lubricant coating does not conflict with providing adhesive connections, since usually the adhesives used are adapted to the presence of the lubricants and have the desired adhesive effect.

Preferably, the hot- and/or cold-rolled strip or sheet also has a minimum thickness of 0.8 mm. Aluminium alloy strips or sheets having a thickness of at least 0.8 mm are often subjected to a forming process, for example deep drawing, in order, for example, to bring a flat sheet into a specific shape required for the application. Preferred thicknesses in automotive engineering are 1.0 to 1.5 mm, for example for attached parts, such as doors, bonnets and hatches, but also 2 mm to 3 mm or up to 4 mm, for example for structural parts, such as parts of the frame construction or chassis. Doors, bonnets and hatches but also the previously mentioned structural components of a motor vehicle particularly often have adhesive connections to other components, in which the respective join partner can also consist of other aluminium alloys or other metals and non-metals. Finally, high forming requirements are often put on attached parts with sheet thicknesses of 1.0 mm to 1.5 mm. Attached parts are often visible components of a motor vehicle, so that here the possibility of shaping the sheets individually plays a very big role.

As already previously explained, in contrast to the known prior art, the surface structure of the aluminium strip is achieved by an electrochemical graining process with an electrolyte. The surface structure and the proportion of the roughened surface can be set by means of the charge input and the current density without an additional rolling step. The process is not only easy to manage but can also be scaled well to large throughput volumes. At the same time, the additional step for applying the passivation as an adhesion promoting layer can be dispensed with.

According to a first embodiment of the method according to the invention, preferably depressions with a reduced valley depth $S_{vk}$ of 1.0 µm to 6.0 µm, preferably 1.5 µm to 4.0 µm, particularly preferably 2.2 µm to 4.0 µm are introduced into the strip or sheet surface by the electrochemical graining. It has been shown that strips with a corresponding surface topography obtain improved properties for providing ageing-resistant adhesive connections. The tribological properties of the aluminium sheet or strip can also be improved with this surface structure. With the limited valley depths $S_{vk}$ of 1.5 µm to 4.0 µm or 2.2 µm to 4.0 µm, an improved forming behaviour can be achieved without affecting the subsequent surface properties, for example the surface appearance after painting.

According to a further embodiment, preferably the strip or sheet is subjected to a cleaning step before the electrochemical graining, in which the surface is cleaned by alkaline or acid pickling and optionally using further degreasing agents and a homogenous removal of material is carried out. The material removal is supposed to essentially eradicate impurities on the surface introduced by the rolling, so that a very suitable surface is available for the electrochemical graining.

Preferably, the electrochemical graining is carried out with $HNO_3$ in a concentration of 2-20 g/l, preferably 2.5 to 15 g/l and with a charge carrier input of at least 200 $C/dm^2$, preferably at least 500 $C/dm^2$. The current densities can vary from at least 1 $A/dm^2$, preferably to 60 $A/dm^2$ or 100 $A/dm^2$. The issue here is the specification of the peak alternating current densities or the peak current densities of pulsed direct current. With the named parameters, it is possible, in accordance with economic process times and electrolytic temperatures of less than 75° C., preferably in the range between room temperature and 50° C. or 40° C., to obtain a sufficient surface coverage of the grained areas. Hydrochloric acid can also be used as the electrolyte as an alternative to nitric acid.

A further embodiment of the method according to the invention involves after the electrochemical graining carrying out at least in certain areas a passivation of the strip surface, preferably by applying a conversion layer, and/or at least in certain areas applying a forming aid. Applying a conversion layer can, as already explained, further improve the ageing resistance of the adhesive connections, since the corrosion resistance of the surface and/or the adhesion to the adhesive are increased. Lubricants and dry-film lubricants, which optionally can be meltable, are understood as forming aids, for example. The conversion layer and the forming aid can be formed as a protective layer and improve the aluminium alloy strip or sheet singly or simultaneously in relation to the corrosion resistance and hence the suitability for storage of the strip or sheet. The forming aid additionally improves the forming properties. Furthermore, as an alternative to the conversion layer, at least in certain areas a protective oil can also be applied for protecting the aluminium alloy strip surface or sheet surface against corrosion. Preferably, the application of the conversion layer is combined with the application of a forming aid which is preferably meltable, in particular a meltable dry-film lubricant, for example a so-called "hot melt". As has already been explained, the formulations used for the adhesives are adapted to the presence of protective oils or forming aids and allow a good adhesive connection to be obtained, despite or in some cases also due to the presence of these substances.

If the process steps mentioned are at least partly carried out on a common production line, a particularly economic production of a corresponding strip surface or of a corresponding aluminium alloy strip or sheet can be provided. Correspondingly produced strips and sheets are, at the same time, suitable for storage and can be easily handled and further processed, since they are protected against corrosion and mechanical damage.

Preferably, the strip or sheet is electrochemically grained after soft annealing or after solution annealing and quenching. This has the advantage that the heat treatment cannot negatively affect the surface properties of the sheet after electrochemical graining and a strip or sheet is provided which is optimised in relation to the requirements for the adhesion of the adhesive. However, optionally, the surface texturing can also be carried out by electrochemical graining before the final annealing, i.e. the soft annealing or the solution annealing and quenching.

According to a further embodiment of the method according to the invention, preferably the method steps are carried out on a production line:
  uncoiling the strip from a coiler,
  cleaning and pickling the strip,
  at least in certain areas electrochemically graining the strip
  at least in certain areas applying a conversion layer and/or a forming aid or alternatively a protective oil.

Aluminium alloy strips or sheets which are suitable for storage and which are optimised for providing adhesive connections can be provided in an economic way by means of these production steps. The surface of the aluminium alloy strips or sheets which is prepared for providing adhesive connections remains essentially unchanged in terms of its properties during storage. Lubricants, in particular dry-film lubricants, for example hot melts, are used as forming aids. These form at room temperature (20-22° C.) a thin film which does not runoff, is pasty and almost dry to handle on the strip or sheet surface based on mineral oil, synthetic oil and/or renewable raw materials. Compared to protective oils, hot melts have improved lubricating properties, in particular during deep drawing. In principle, it is also possible to apply only a protective oil after the electrochemical graining and to only apply a forming aid before the forming process.

Finally, according to a third teaching, the indicated object is achieved by an adhesive connection, in particular an adhesive connection of a motor vehicle, between at least two join partners by the fact that at least one join partner is a sheet according to the invention consisting of an aluminium alloy and that the adhesive connection is provided in at least one area of the sheet which has a surface structure comprising depressions produced by electrochemical graining. As has already been explained, the ageing resistance of the adhesive connection to the sheet according to the invention is considerably improved by the corresponding surface treatment of the at least one join partner of the adhesive connection. Depending on the application, epoxide adhesives, epoxide/polyimide blends, polyurethane adhesives, acrylate adhesives, phenol resins, silane modified polymers or hot melt adhesives, so-called hot melts, for example can be used for the adhesive connection. The last mentioned hot melts differ, however, from the dry-film lubricants by their adhesion.

BRIEF DESCRIPTION OF THE DRAWINGS

The invention is to be explained in more detail below by means of exemplary embodiments in conjunction with the figure. In the figure shows FIG. 1 schematically the determination of the parameters $S_k$, $S_{pk}$ and $S_{vk}$ by means of an Abbott curve, FIG. 2 a microscopic photograph of an exemplary embodiment not according to the invention, FIG. 3 a microscopically enlarged photograph of an exemplary embodiment of a strip surface according to the invention, FIG. 4 in a schematic illustration an exemplary embodiment of a production line for carrying out the method according to the invention, FIG. 5 a schematic sectional view of an exemplary embodiment of a strip or sheet according to the invention, FIGS. 6a), b) schematically in a plan view and a perspective view the test arrangement for carrying out the shear tension tests on adhesive connections, FIGS. 7a) to e) different fracture patterns during the shear tension test in a schematic sectional view, FIG. 8 in a diagram results of shear tension tests for eight different exemplary embodiments before and after weathering and FIGS. 9a) to c) three schematic sectional views of exemplary embodiments of an adhesive connection according to the invention.

DETAILED DESCRIPTION OF THE INVENTION

Figure 1:
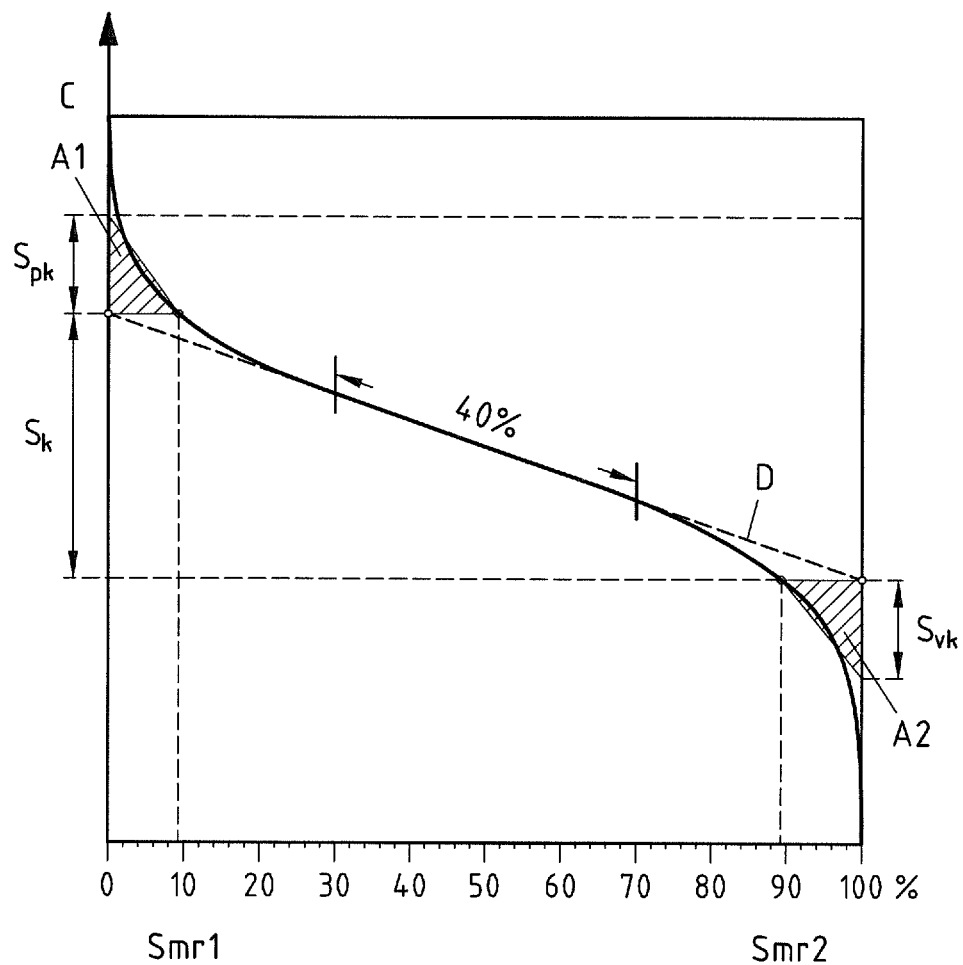

In FIG. 1, it is firstly illustrated how the parameter values for the core roughness depth $S_k$, the reduced valley depth $S_{vk}$ and the reduced peak height $S_{pk}$ can be determined from an Abbott curve. The determination is carried out according to DIN-EN-ISO 25178 for a measurement area conforming to standards. Usually, optical measurement methods, for example confocal microscopy, are used in order to determine a height profile of a measurement area. From the height profile of the measurement area the area ratio of the profile can be determined which intersects an area parallel to the measurement area at the height c or runs above the area. If the height c of the intersecting plane is represented as a function of the area ratio of the intersecting plane to the whole area, the Abbott curve is obtained which shows the typical S-shaped course for rolled surfaces.

In order to determine the core roughness depth $S_k$, the reduced valley depth $S_{vk}$ or the reduced peak height $S_{pk}$, a secant D having a 40% length is moved into the determined Abbott curve such that the value of the slope of the secant D is minimal. The core roughness depth $S_k$ of the surface results from the difference between the abscissa values of the intersection points of the secant D with the abscissa at 0% material ratio and at 100% material ratio. The reduced peak height $S_{pk}$ and the reduced valley depth $S_{vk}$ correspond to the height of a triangle which has an area equal to the peak area A1 or groove area A2 of the Abbott curve. The triangle of the peak area A1 has as the base area the value Smr1 which results from the intersection point of a parallel to the X axis with the Abbott curve, wherein the parallel to the X axis runs through the intersection point of the secant D with the abscissa at 0% material ratio. The triangle of the groove area or valley area A2 has as the base area the value 100%−Smr2, wherein Smr2 results from the intersection point of a parallel to the X axis with the Abbott curve and the parallel to the X axis runs through the intersection point of the secant D with the abscissa at 100% material ratio.

The measurement profile can be characterised by these parameters. It can be determined whether it is a plateau-like height profile with depressions or, for example, the peaks in the height profile of the measurement area predominate. In the former case, the value for $S_{vk}$ increases and in the latter case the value for $S_{pk}$ increases.

From the optical measurement of the surfaces, the valley density of the texture $n_{clm}$ can also be determined as a further parameter of the surface via the maximum number of closed void volumes $n_{clm}$, i.e. depressions or valleys dependent on the measurement height c in percent per mm². This gives the number of closed void areas per unit area (1/mm²) at a given measurement height c (%). The maximum $n_{clm}$ is determined from $n_{cl}(c)$. The greater $n_{clm}$ is, the finer the surface structure is.

Furthermore, the closed void volume Vvcl can also be determined by the optical measurement by integration of the closed void areas $A_{vcl}(c)$ via the measurement height c. The closed void volume is also a characteristic surface feature of the strips and sheets according to the invention.

The measurement of the roughness of the surface, as already mentioned, is carried out optically, since in this way scanning can be performed considerably faster compared to a tactile measurement. The optical measurement is carried out, for example, via interferometry or confocal microscopy, as was carried out in the case of the present measurement data. According to EN ISO 25178-2, the measurement areas are also determined with regard to their size. The measurement data was determined via quadratic measurement areas with a side length of 2 mm in each case.

Figure 2:
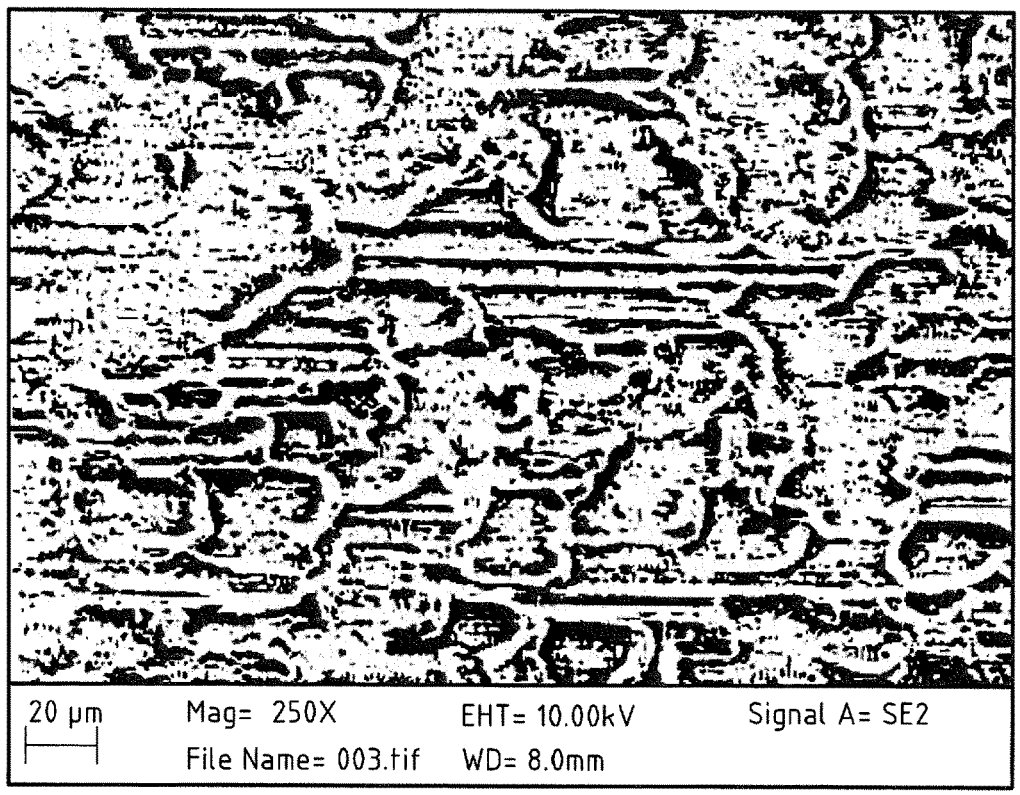
Figure 3:
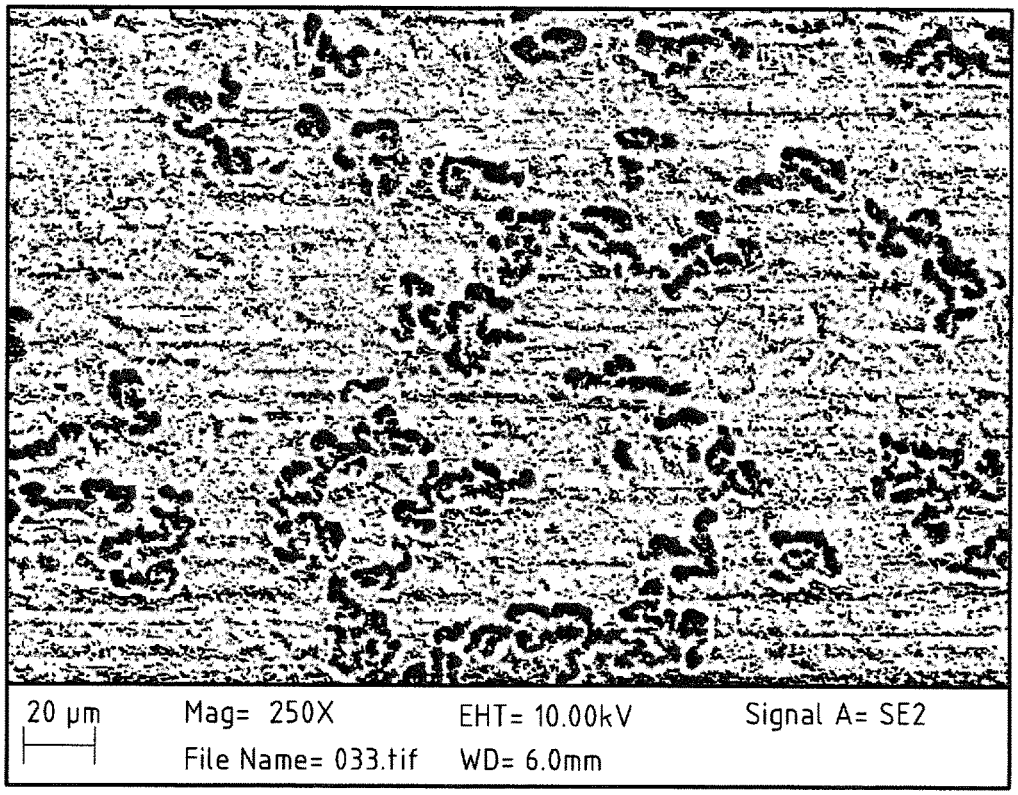

In FIG. 2, firstly a view of a conventional strip surface magnified 250 times is depicted, in order to show the differences between the conventional strips roughened for example with EDT structured rolls and the strips structured according to the invention. In contrast, FIG. 3 shows an exemplary embodiment of a strip surface according to the invention which was produced using an electrochemical graining process and has likewise been magnified 250 times. It can be clearly identified that for one thing the structures in the case of the electrochemical graining are finer and consist of depressions in a plateau-like surface. Unlike in the conventional embossing by rolling depicted in FIG. 2, in the case of the electrochemical graining according to the invention no peaks are introduced into the material, but rather the rolled surface, here a "mill finish" surface, is only altered or modulated by the introduction of depressions. It is at the present time assumed that the depressions which form during electrochemical graining can provide more lubricants for the forming process due to the larger closed void volumes and therefore improved forming properties are obtained. It was also recognised that the higher valley depth $S_{vk}$ can evidently also provide lubricants in the case of great surface stress during the forming and hence improves the forming behaviour.

Figure 4:
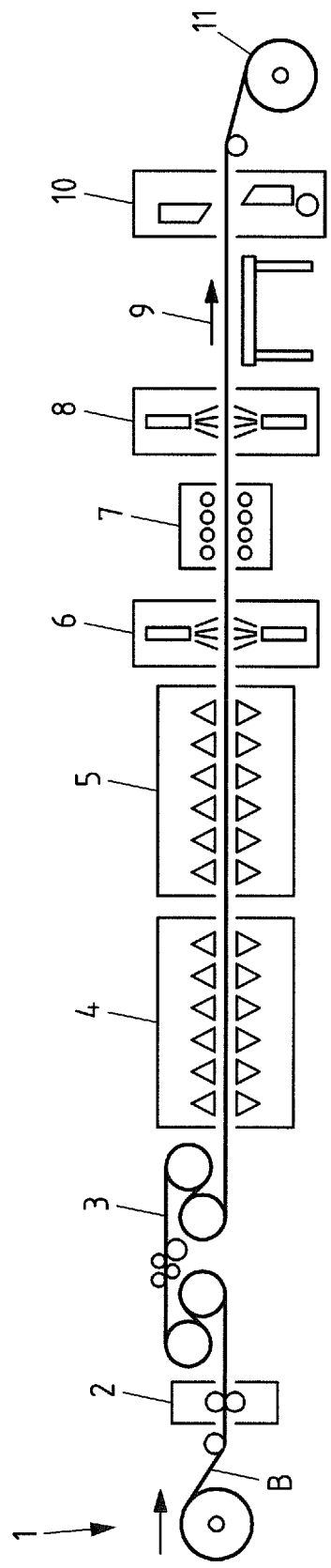

In FIG. 4, a first exemplary embodiment of a method is depicted by means of a schematic diagram of a production line for producing a strip B according to the invention. In the illustrated exemplary embodiment, the strip B which preferably at least partly consists of an aluminium alloy of the type AA7xxx, type AA6xxx or type AA5xxx or type AA3xxx, in particular AA7020, AA7021, AA7108, AA6111, AA6060, AA6014, AA6016, AA6106, AA6005C, AA6451, AA5454, AA5754, AA5182, AA5251, AA3104, AA3103 or AlMg6 is uncoiled via a coiler 1. The thickness of the strip is preferably at least 0.8 mm, but at most 4 mm, and preferably between 1.0 mm and 1.5 mm, for use in the automotive industry for example. In principle, the thickness, for example in the case of strips for the production of beverage cans, can also be 0.1 mm to 0.5 mm. In the case of these thin strips, the improved forming behaviour is also noticeable with the production of beverage cans which requires maximum deformation degrees.

According to the present exemplary embodiment, the strip uncoiled with the coiler 1 preferably has the state soft annealed "0" if it is an aluminium alloy of the type AA55xxx or preferably the state solution annealed and quenched "T4" in the case of an aluminium alloy of the type AA6xxx. Hence, the strip is already available in a state in which it can be particularly well formed. However, it is also conceivable to carry out the heat treatment after the surface processing or the introduction of depressions and process the surface of hard rolled strips.

According to the exemplary embodiment, the uncoiled aluminium alloy strip B is conveyed to an optional trimming process for trimming the side edges 2. Subsequently, likewise optionally, the strip passes through a straightening device 3, in order to remove deformations from the strip. In the device 4, the strip is subjected to an optional cleaning and an optional pickling step or an electrolytic degreasing. Mineral acids, but also bases, for example based on sodium hydroxide solution, come into consideration as the pickle here. The response of the strip to electrochemical graining can hereby be improved. The step 4 of pickling is also optional. After an optional rinsing, in step 5 the aluminium strip is subjected to an electrochemical graining process, in which depressions are introduced into the surface. During electrochemical graining, current flows at a certain current density through the strip surface, which by choosing a suitable electrolyte causes depressions to be introduced into the strip surface and aluminium to be removed at the corresponding places. Preferably, the electrochemical graining is carried out in such a way that a valley depth $S_{vk}$ of 1.0 μm-6.0 μm, preferably. 1.5 μm-4.0 μm, particularly preferably 2.2 μm-4.0 μm, is obtained. It has been shown that with these specific values the forming behaviour of the aluminium alloy strip is very good in a subsequent forming process. In addition, it was shown that the ageing resistance of adhesive connections could also be increased with this surface treatment.

Preferably, the electrochemical graining is carried out using $HNO_3$ (nitric acid) in a concentration of 2.5-20 g/l, preferably with 2.5 to 15 g/l, with alternating current at a frequency of 50 Hz. The charge carrier input is preferably at least 200 $C/dm^2$, preferentially at least 500 $C/dm^2$, in order to achieve a sufficient area coverage with electrochemically introduced depressions. At least 1 $A/dm^2$, preferably up to 100 $A/dm^2$ and more, are used as peak current densities for this purpose. The choice of the current densities and of the concentration of the electrolyte is dependent on the production rate and can be adapted accordingly. In particular, the reactivity and hence the production rate can also be influenced via the temperature of the electrolyte. Preferably the electrolyte can have a temperature of at most 75° C. With nitric acid as the electrolyte, a preferred operating range is between room temperature and about 40° C., at most 50° C. In addition to nitric acid, hydrochloric acid is also suitable as the electrolyte.

Preferably, the electrochemical graining of the surface of the strip B in step 5 is carried out on both sides. However, it is also conceivable for a corresponding surface structure to be introduced on just one side. After electrochemical graining, a rinsing step has proved to be particularly beneficial. Subsequently, according to the exemplary embodiment illustrated in FIG. 5, in production step 6 the aluminium alloy strip surface can be passivated, for example by applying a conversion layer. This processing step is also optional.

Preferably, drying is carried out in step 7 before in the optional step 8, according to the illustrated exemplary embodiment, either a protective oil or a layer comprising a forming aid is applied to the strip, preferably on both sides. The forming aid is preferably a lubricant, in particular a meltable dry-film lubricant, for example a hot melt. A meltable dry-film lubricant as a protective layer and lubricant can make it easier to handle the aluminium alloy strips or sheets according to the invention and, at the same time, further improve the forming properties. Lanolin, for example, can also be used as a dry-film lubricant which consists of renewable raw materials.

As an alternative to coiling the strip B with the coiler 11, the strip can also be cut up into sheets by means of the strip cutter 10. A visual inspection of the strip for defects is provided in step 9, so that surface defects can be identified early.

As has already been stated, the exemplary embodiment from FIG. 4 shows several optional production steps which are carried out inline directly one after the other on the same production line. The exemplary embodiment from FIG. 4 is therefore a particularly economic variant of the method according to the invention. However, it is also possible to just combine the uncoiling of a strip according to step 1 and the electrochemical graining according to step 5 with a coiling or cutting up into sheet blanks. In principle, electrochemical graining of sheet blanks is also conceivable.

Figure 5:
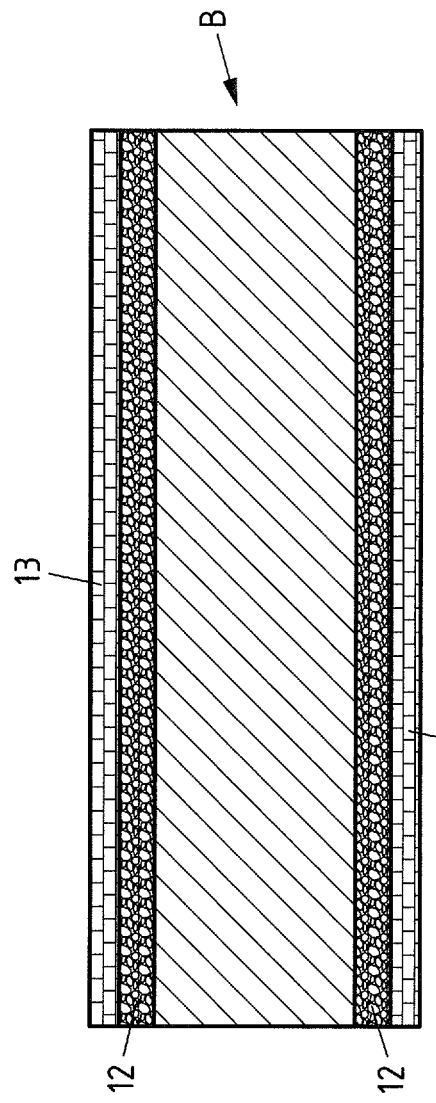

An exemplary embodiment of a strip B according to the invention is now illustrated in a schematic sectional view in FIG. 5 which has depressions 12 introduced into the surface on both sides and additionally has an applied layer of a meltable dry-film lubricant 13. A corresponding strip B has maximum forming properties and can also be stored without difficulty, since the surface is protected. Corresponding strips B, even with a surface grained on one side, can also be used as outer skin parts of a motor vehicle, since the surface has maximum protection from the forming process or considerably supports the forming. Due to the surface protection, sheets produced from a strip B have very good handleability in the forming process and exhibit a very good adhesion to adhesives which, in addition, is particularly resistant to ageing.

Finally, sheets were produced with the different surface topographies both from an aluminium alloy of the type AA5xxx and of the type AA6xxx and were measured in relation to their surface parameters using a confocal microscope. The strips of the aluminium alloy of the type AA5xxx were in the "0" state and the strips of the aluminium alloy of the type AA6xxx were in the "T4" state. An aluminium alloy of the type AA 5182 was used as the AA5xxx type. The aluminium alloy of the AA6xxx alloy corresponded to an aluminium alloy of the type AA6005C. The tests V1 to V4 were produced using an identical aluminium alloy of the type AA6005C and the tests V5 to V8 using an identical aluminium alloy of the type AA5182, in order to exclude influences of different compositions within the alloy types.

As Table 1 shows, the surface topographies of the comparison examples V1, V2, V3 and V6 were produced using conventional methods in the last rolling step by rolling with a roll with a "mill finish" surface or by embossing by rolling these strips having a "mill-finish" surface using an EDT textured roll.

The strips produced in this way were used for the tests V3, V4, V7 and V8. In the case of the exemplary embodiments V3, V4, V7 and V8 according to the invention, both the strips with surfaces embossed using EDT rolls and the strips with "mill finish" surfaces were additionally electrochemically grained using the method according to the invention.

TABLE 1

| No. | Alloy | Surface | Electrochemical graining | Strip thickness |
|---|---|---|---|---|
| V1 | Comparison 6005C | Mill finish | No | 1.15 mm |
| V2 | Comparison 6005C | EDT | No | 1.10 mm |
| V3 | Invention 6005C | Mill finish | Yes | 1.15 mm |
| V4 | Invention 6005C | EDT | Yes | 1.10 mm |
| V5 | Comparison 5182 | Mill finish | No | 1.15 mm |
| V6 | Comparison 5182 | EDT | No | 1.10 mm |
| V7 | Invention 5182 | Mill finish | Yes | 1.15 mm |
| V8 | Invention 5182 | EDT | Yes | 1.10 mm |

In the tests V1 to V4, a hot- and cold-rolled strip consisting of an alloy of the type AA6005C was used. The final thickness of the strip after the conventional rolling process with a mill finish surface was 1.15 mm, the tests V1 and V3. A strip likewise having a mill finish surface was produced from an aluminium alloy of the type AA 5182 and used for the tests V5 and V7.

The tests V2, V6 were textured conventionally by using EDT rolls. As can be understood from Table 1, the EDT textured surfaces were subjected to electrochemical graining and were evaluated as tests V4 and V8. The same was carried out for the strips with "mill finish" surfaces of both aluminium alloys. The electrochemically grained sheets were evaluated as tests V3 and V7. With the electrochemical graining, depending on the alloy, a $HNO_3$ concentration of 4 g/l with a charge carrier input of 500 $C/dm^2$ was used in the tests V3 and V4 and a $HNO_3$ concentration of 5 g/l with a charge carrier input of 900 $C/dm^2$ was used for V7 and V8. The electrolyte temperature was between 30° C. and 40° C. with all variants.

When the surfaces of the test sheets were optically measured it was, according to expectations, apparent that the sheets of the tests V2, V6 produced by means of EDT textured rolls had distinctly larger values with regard to the arithmetical mean deviation of the roughness profile $S_a$ and the reduced peak height $S_{pk}$ than the strips of tests V1 and V5 which had the mill finish surfaces. In contrast, the electrochemically grained exemplary embodiments V3, V4, V7 and V8 exhibited an average roughness $S_a$ which was approximately at the level of the EDT surface texture of tests V2 and V6. The measured values are specified in Table 2.

However, in contrast to the conventional texture, with electrochemical graining the value for the reduced valley depth $S_{vk}$ increases by more than a factor of 4, and here by a factor of at least 5. The differences in the textures can be read clearly here.

The closed void volume $V_{vcl}$, which represents the volume for providing lubricant in lubricant pockets, is larger in the case of the strips V2 and V6 with 362 and 477 $mm^3/m^2$ respectively compared to the "mill finish" variants V1 and V5 with 151 $mm^3/m^2$ and 87 $mm^3/m^2$ respectively.

The electrochemically grained exemplary embodiments V3, V4 and V7 and V8 according to the invention, on the other hand, show a closed void volume $V_{vcl}$ of at least 500 $mm^3/m^2$. The closed void volume, which is important for absorbing lubricant, can be increased by distinctly more than 10% in the case of the strips according to the invention which have passed through an electrochemical graining step.

The valley density of the structure with values of the variants V3, V4, V7 and V8 according to the invention of more than 80 per $mm^2$, preferably between 100 and 150, is greater by distinctly more than 25% than in the case of conventionally EDT textured strip surfaces of the comparison tests V2 and V6.

The improvement in the forming behaviour is attributed to the different topography of the exemplary embodiments according to the invention which is characterised by the different values of the reduced valley depth $S_{vk}$, of the closed void volume $V_{vcl}$, and of the valley density of the surface. In addition, the adhesion of the adhesive is also improved by the electrochemical graining, both in the unweathered original state and after climatic and/or corrosive stress.

As a result, a formed sheet, for example an inside door panel or an outer skin panel of a motor vehicle, can hence also be provided which goes through high degrees of deformation until it is made into the final shape.

Thus, by means of the method according to the invention and by means of the strip or sheet according to the invention, an even wider area of application can be made available for aluminium alloys in the field of motor vehicles, since the greater deformation degrees allow further application possibilities. Due to the fact that, at the same time, the adhesive connections often used in these areas of the motor vehicle are improved with regard to their ageing resistance, new applications can also be made possible in the motor vehicle having regard to the adhesive connections.

TABLE 2

| No. | Alloy | $S_a$ μm | $S_{pk}$ μm | $S_k$ μm | $S_{vk}$ μm | Ssk | $n_{clm}$ $1/mm^2$ | $V_{vcl}$ $mm^3/m^2$ |
|---|---|---|---|---|---|---|---|---|
| V1 | Cmp. 6005C | 0.38 | 1.21 | 0.98 | 0.57 | 2.72 | 75 | 151 |
| V2 | Cmp. 6005C | 0.83 | 1.56 | 2.79 | 0.40 | 0.79 | 66 | 362 |
| V3 | Inv. 6005C | 0.93 | 0.47 | 1.33 | 3.34 | −1.32 | 123 | 555 |
| V4 | Inv. 6005C | 1.13 | 1.50 | 3.21 | 2.08 | −0.18 | 94 | 566 |
| V5 | Cmp. 5182 | 0.37 | 0.51 | 1.21 | 0.37 | 0.32 | 56 | 87 |
| V6 | Cmp. 5182 | 1.13 | 2.66 | 2.54 | 0.34 | 1.35 | 67 | 477 |
| V7 | Inv. 5182 | 0.93 | 0.55 | 1.84 | 3.13 | −2.15 | 135 | 605 |

TABLE 2-continued

| No. | Alloy | | $S_a$ μm | $S_{pk}$ μm | $S_k$ μm | $S_{vk}$ μm | Ssk | $n_{clm}$ 1/mm² | $V_{vcl}$ mm³/m² |
|---|---|---|---|---|---|---|---|---|---|
| V8 | Inv. | 5182 | 1.19 | 2.42 | 2.87 | 2.03 | 0.56 | 83 | 542 |
| V13 (Lithographic sheet after EC graining) | Cmp. | AA1xxx | 0.3 to 0.6 | 0.2 to 0.55 | 0.9 to 1.5 | 0.44 to 1.1 | −0.85 to 0.32 | 200 to 240 | <360 |

Since electrochemical graining is also used in the production of printing plate supports, several electrochemically grained lithographic sheets of the alloy A1xxx were measured and the measurement results were summarised as test V13. Although lithographic sheets are electrochemically roughened, the roughening serves another purpose. Also, no forming is carried out on lithographic strips or sheets, but rather, after the electrochemical roughening they are coated with a light-sensitive layer. The roughening is intended to enable a print result to be produced that is as uniform as possible. Hence, in the sense of the present invention, lithographic sheets and strips are neither provided nor prepared for forming or for adhesive bonding. They differ fundamentally in their structure.

The surfaces optimised according to the invention for providing adhesive connections show clear differences in the topography to lithographic sheets, as the summarised measurement results of various measured lithographic sheets, shown in comparison example V13, show. Lithographic, heets usually have not only distinctly lower average roughness values $S_a$, but also possess a distinctly lower reduced valley depth $S_{vk}$. The average valley density $n_{clm}$, on the other hand, lies slightly above the surfaces of the sheets V3, V4, V7 and V8 according to the invention which are electrochemically grained and are optimised for the forming process.

Figure 6A:
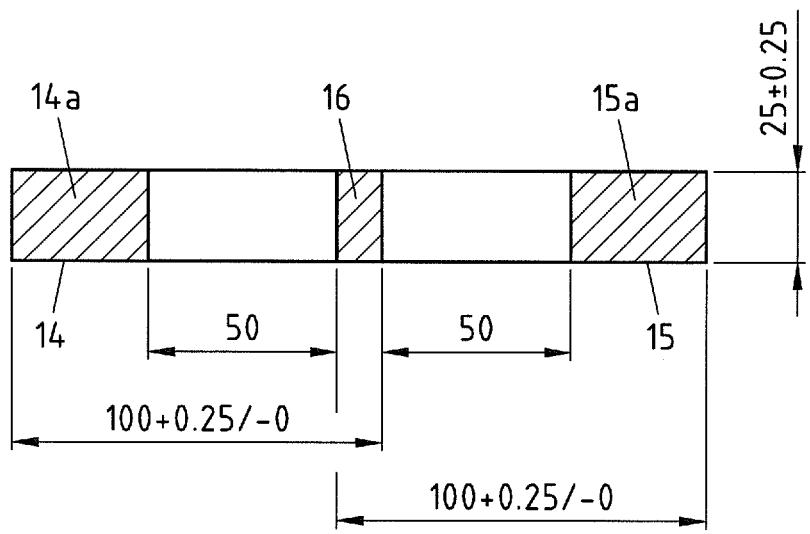

FIGS. 6a) and 6b) schematically show the carrying out of shear tension tests of adhesive connections between two samples, in which FIG. 6a) shows the arrangement of the samples 14 and 15 in a plan view. The samples 14 and 15 are cut out of a strip or sheet. The cut edges are deburred. The dimensions of the samples are 100 mm in the length and 25 mm in the width. A clamping area 14a and 15a is provided at a distance of approximately 50 mm from an approximately 10 to 14 mm large overlapping area 16 of the two samples 14 and 15. The overlapping area is provided for the adhesive connection between the samples 14, 15. Depending on the testing machine, the clamping area 14a and 15a can be provided with a punch hole. The samples are designed corresponding to the norm DIN EN 1465, wherein the overlapping area is not 12.5 mm, but can as described vary between 10 and 14 mm. DIN EN 1465 describes the measurement of shear tension strengths of high-strength overlapping adhesive connections.

As has already been explained, the adhesives are usually prepared on the delivered surfaces of the aluminium alloy strip provided, for example, with, a protective oil, a conversion layer or another organic coating, so that no further surface treatments have to be carried out before applying the adhesive.

The adhesive is now applied in the overlapping area 16 of one of the samples 14, 15. In order to ensure that there is a uniform thickness in the adhesive connection, particularly when testing structural adhesives, glass beads, for example having a diameter of 0.3 mm, are arranged in the adhesive mass, so that the glass beads provide a firm joint thickness for the adhesive connection for each sample. The adhesion itself is carried out using positioning devices, in which the samples 14, 15 can be precisely positioned, so that the overlap adhesion in the overlapping area 16 is not exposed to any torsional moments during the tension test. These positioning devices ensure that the samples can only be adhesively connected precisely aligned with one another. Such positioning devices can also hold a plurality of samples, so that a plurality of adhesively connected samples can be hardened at the same time. The positioning devices used are not illustrated here.

After applying the adhesive and positioning the two samples together, the excess adhesive is removed on all face sides of the sample using a spatula. Then, the adhesively connected samples 14, 15 are hardened. Hardening can, for example, take place in two stages, wherein, the specifications of the adhesive used must, of course, be observed. In the present exemplary embodiments, the samples were used using the adhesive "Betamate 1630" from the Dow Chemical Company. The hardening of this epoxide-based adhesive takes place in two stages. In the first stage, the samples were heated to 125° C. for 12 minutes. After cooling to room temperature, these samples were then heated again to 175° C. for 15 minutes. The unaged samples were then after 24 hours or so measured in relation to the tensile lap-shear strength of the adhesive connection. The samples provided for artificial ageing were aged for 500 hours in a salt spray test according to DIN EN ISO 9227 and subsequently examined in relation to their tensile lap-shear strength.

Figure 6B:
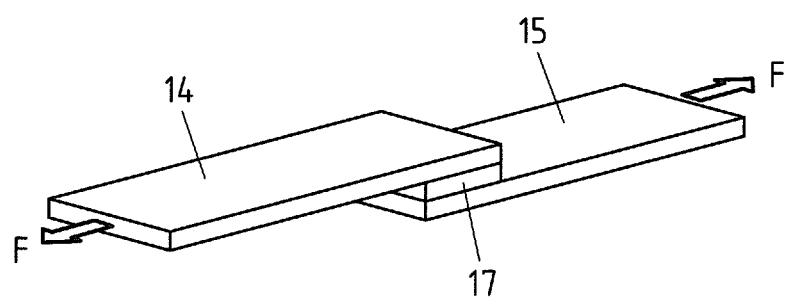

FIG. 6b) shows in a perspective, schematic view the two samples 14 and 15 which are joined together by an adhesive connection or adhesive joint 17. Since the tensile lap-shear strength is dependent on the overlap surface of the adhesive connection 17, the surfaces of the adhesive connection were in each case measured after each shear tension test. The maximum forces F to be exerted until the adhesive connection breaks were measured in order to determine the tensile lap-shear strength. With the respective sample the tensile lap-shear strength then results by dividing by the corresponding areas of the respective adhesive surface.

Figure 7A:
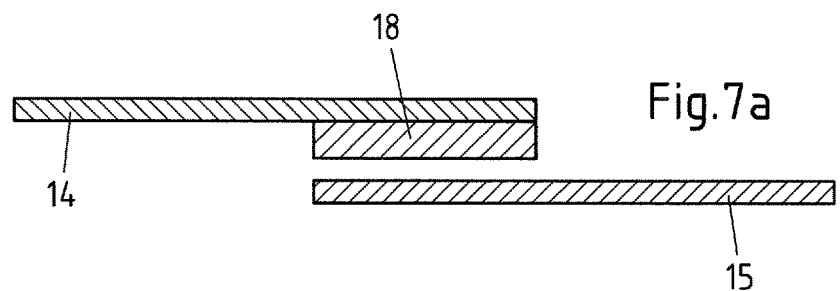
Figure 7B:
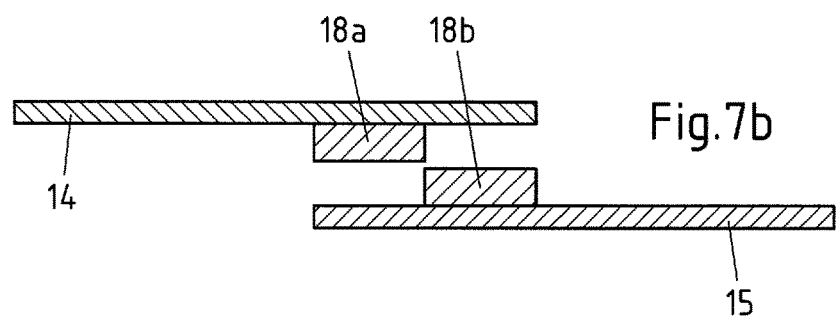

As has already been mentioned, an aim in using adhesive connections, for example in automotive engineering, is to utilise the cohesion forces of the adhesive. For this purpose, the adhesion bond between the adhesive and the sheet must be greater than the cohesion forces of the adhesive. FIGS. 7a) to 7e) show the different fracture patterns of the samples which can be divided into undesirable fracture patterns of FIGS. 7a) and 7b) and into the desirable fracture patterns 7c), 7d) and 7e). In the case of the undesirable fracture patterns of FIGS. 7a) and 7b), the force of adhesion to the surface of the sheet is insufficient, so that the adhesive 18, for example, becomes fully detached from the sample 15. In this case, the cohesion forces of the adhesive used are not fully utilised. The same also applies when the adhesive becomes detached from one of the samples 14 or 15 in one or more partial areas 18a, 18b. The undesirable fracture patterns of the adhesive connections illustrated in FIGS. 7a) and 7b) could not be observed in the samples according to the invention.

Figure 7C:
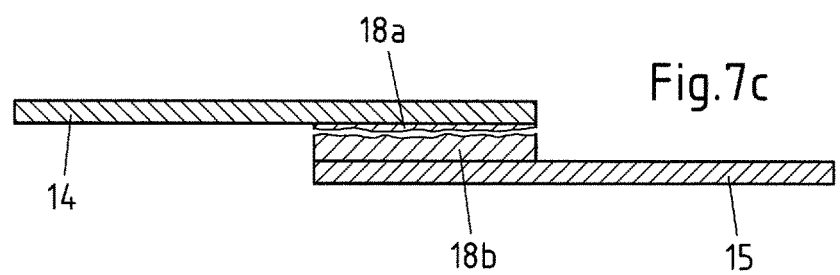
Figure 7D:
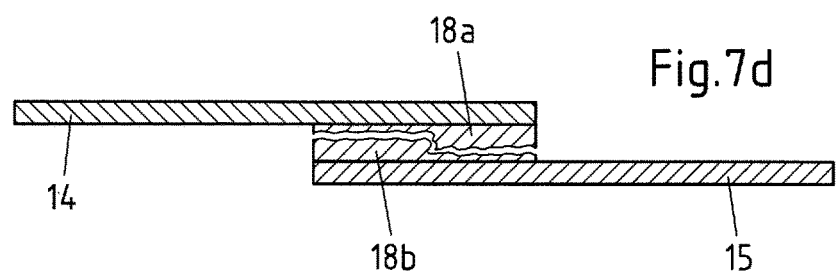
Figure 7E:
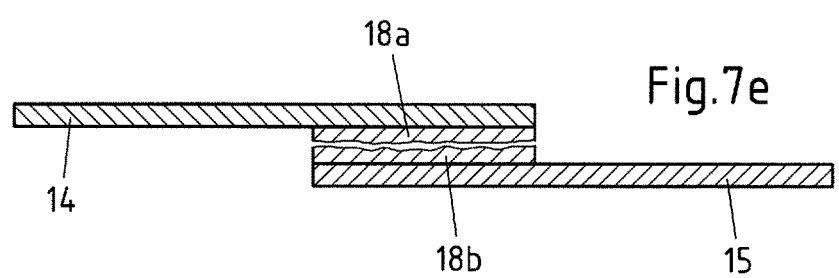

In contrast, FIGS. 7c), 7d) and 7e) show fracture patterns in which the adhesive 18 has remained on the respective side of the sample over the full surface and the fracture seam runs fully through the mass of the adhesive. In this case, the cohesion forces of the adhesive have been utilised to the maximum and an adhesive connection providing the maximum strength of the adhesive is made available.

Figure 8:
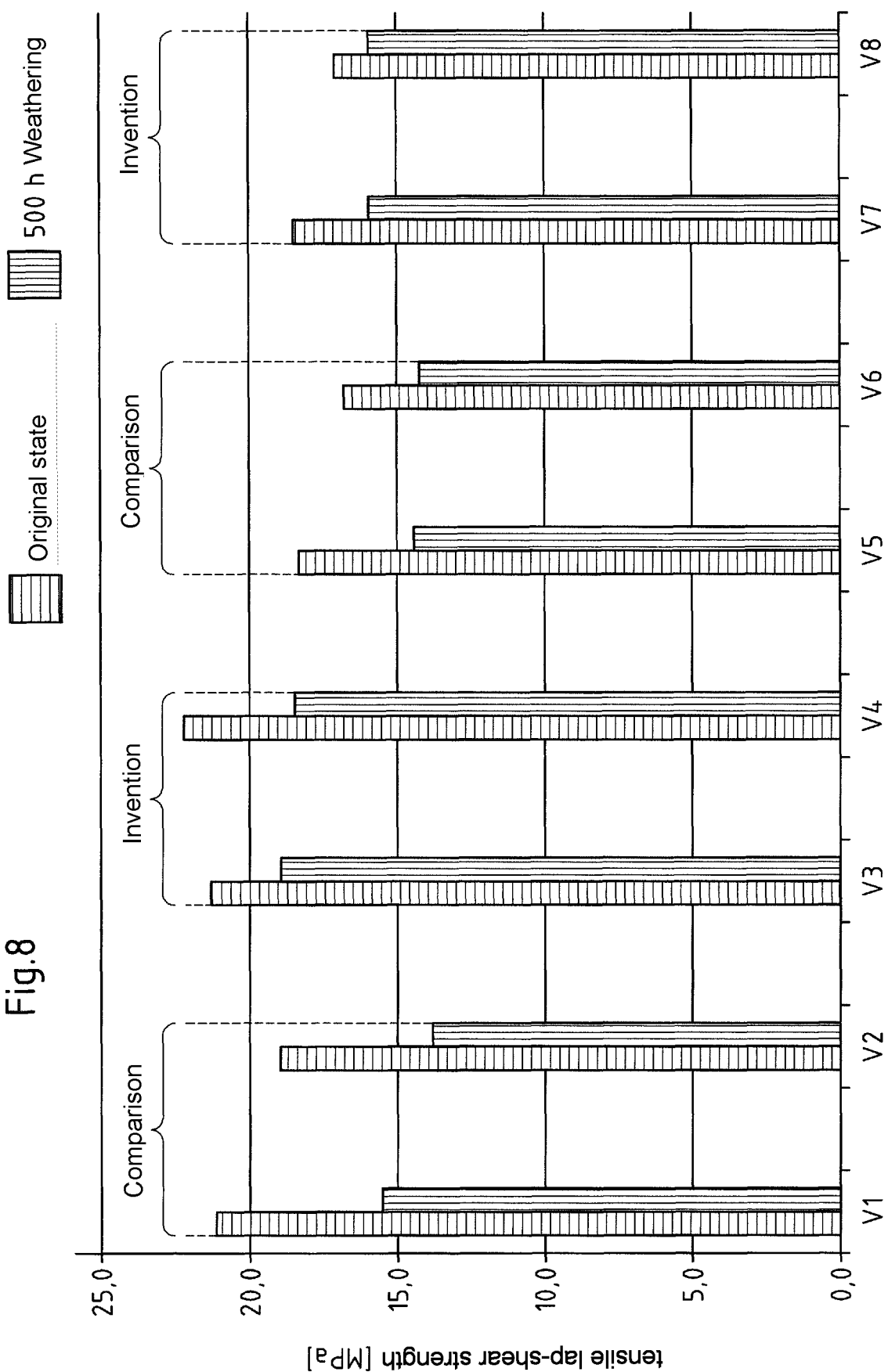

Corresponding samples were produced from the above described aluminium alloy strips consisting of the alloys AA6005C or AA5182, which were produced either conventionally or according to the invention, and the tensile lap-shear strength was determined. Five samples were produced for each test material V1 to V8 and subjected to a shear tension test in each case. Subsequently, the average values of the measured tensile lap-shear strengths were determined for the respective tests V1 to V8 and illustrated in a diagram in FIG. 8. The hatched column in each case represents the measurement of the tensile strength in the original state, i.e. unaged. The black column, on the other hand, in each case shows the tensile lap-shear strength after an ageing test of 500 hours according to DIN EN ISO 9227.

The two alloy groups of the tests V1 to V4, an aluminium alloy of the type AA6xxx and the test group of the tests V5 to V8, an aluminium alloy of the type Aa5xxx show different adhesive properties. The tests V5 to V8 with samples consisting of an aluminium alloy AA5182 exhibit tensile lap-shear strengths which are below those of the aluminium alloy AA6005C. It is assumed that the increased magnesium content of the samples adversely affects the development of an adhesive connection. After baking the adhesive, the samples V1 to V4 have the state T6 which is typical for the AA6xxx aluminium alloys.

The variants V3, V4 according to the invention show, for example, a distinct increase with respect to the tensile lap-shear strength of the adhesive connection compared to the non-electrochemically grained surfaces of the tests V1 and V2. In particular, it can also be noticed that after ageing the tensile lap-shear strength of the electrochemically grained variants V3, V4, V7 and V8 is higher compared to the untreated variants V1, V2, V5 and V6. For example, the tensile lap-shear strength does not fall below 15 MPa after a weathering process in the case of the electrochemically grained exemplary embodiments.

The individual measurement results can be read in Table 3. The tensile lap-shear strength Pmax is also shown in addition to the maximum tensile force Fmax measured by the tension shear test arrangement. As has already been explained, Pmax results by the division of the measured value by the measured surface of the adhesive connection between the samples. The average value, which is shown in Table 3, was then determined from the respectively determined values for Pmax of the individual tension tests. The fracture path is additionally specified by s in millimetres. The fracture path corresponds to the distance by which the sample has stretched up to fracture. The values Fmax, Pmax and s just mentioned are additionally illustrated after weathering of the samples for 500 hours in the cold salt spray test (NSS) according to DIN EN ISO 9227. Additionally, the relative reduction in the tensile lap-shear strength ΔPmax is also shown.

It has also been shown that the exemplary embodiments according to the invention have considerably lower reductions in the tensile lap-shear strengths in their respective alloy areas and surface areas in a weathering process. Thus, for example, the comparison example V1 has a reduction in the tensile lap-shear strength of 25.5%, while the exemplary embodiment according to the invention with an identical original surface before the electrochemical graining only has a reduction in the tensile lap-shear strength of 8.9% after weathering. Correspondingly, the pairings comparison example V2 can be compared with the exemplary embodiment V4 and V5 with V7 and V6 with V8. As a result, the reduction in the tensile lap-shear strength of the adhesive connection due to ageing can be improved by the aluminium alloy strip according to the invention by more than 20%.

Figure 9A:
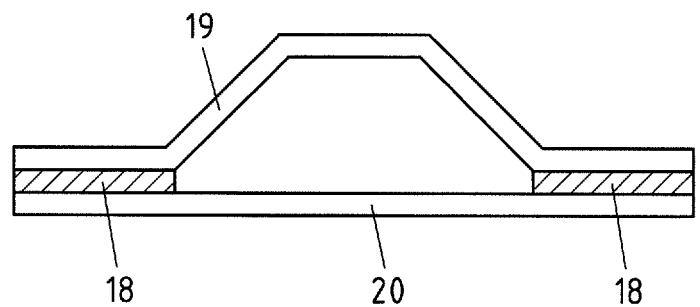
Figure 9B:
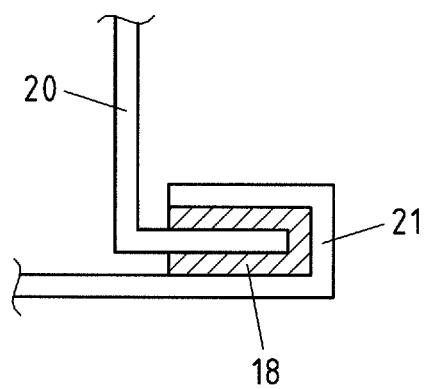
Figure 9C:
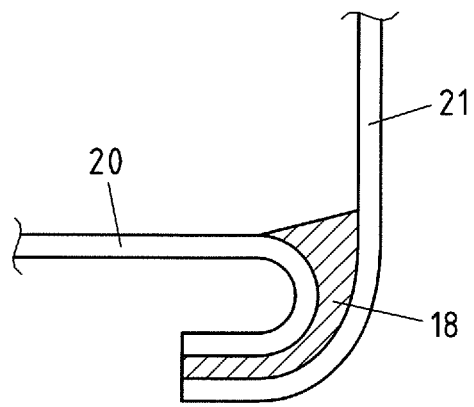

In FIG. 9, three typical adhesive connections, as used for example in motor vehicles, are schematically shown. In addition to the full-surface connecting joint shown in FIG. 9a), for example of a profile 19 with a flat sheet 20 for providing a hollow profile, crimped adhesive connections between two sheets 21 and 22, as shown in FIGS. 9b) and 9c), are often also used as adhesive connections in automotive engineering. Here, the adhesive 18 at the same time serves as a sealant. Bonnets, parts of the door sill and attached parts in the area of the boot, amongst other things, are bonded with such adhesive connections. The possible uses of the adhesive connections in connection with aluminium alloy sheets can be expanded even further by the aluminium alloy strips according to the invention, since the strips according to the invention can provide adhesive connections which are particularly resistant to ageing.

TABLE 3

| Sample No. | | Original state | | | 500 h NSS | | | ΔPmax % |
|---|---|---|---|---|---|---|---|---|
| | | Fmax N | Pmax MPa | s mm | Fmax N | pmax Mpa | s mm | |
| V1 | Comparison | 5814 | 20.8 | 1.4 | 4049 | 15.5 | 0.5 | 25.5 |
| V2 | Comparison | 5754 | 19.0 | 1.8 | 3143 | 14.0 | 0.4 | 26.3 |
| V3 | Invention | 5979 | 21.1 | 1.7 | 5620 | 19.2 | 1.3 | 8.9 |
| V4 | Invention | 5784 | 22.3 | 1.6 | 4662 | 18.8 | 0.6 | 15.5 |
| V5 | Comparison | 5136 | 18.5 | 1.6 | 4146 | 14.6 | 0.9 | 20.8 |
| V6 | Comparison | 4859 | 16.8 | 1.5 | 3949 | 14.6 | 0.8 | 13.3 |
| V7 | Invention | 5087 | 18.8 | 1.7 | 4184 | 15.8 | 0.9 | 16.1 |
| V8 | Invention | 5274 | 17.1 | 2.0 | 4469 | 15.7 | 1.3 | 8.1 |

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, comprising:
utilizing a strip consisting of an aluminium alloy for providing adhesive connections in motor vehicles, wherein
the strip at least in certain areas has a surface structure prepared for an adhesive connection, wherein the surface structure has depressions which were produced using an electrochemical graining process, wherein the surface structure which is at least provided in certain areas is provided on at least one or on both sides of the strip and has a reduced valley depth $S_{vk}$ of 1.0 µm to 6.0 µm.

2. The method according to claim 1,
wherein
the strip comprises an aluminium alloy of the type AA7xxx, type AA6xxx, type AA5xxx or of the type AA3xxx.

3. The method according to claim 1,
wherein
the strip is designed for producing sheets for motor vehicles.

4. The method according to claim 1,
wherein
the surface structure which is at least provided in certain areas is provided on at least one or on both sides of the strip and has a reduced valley depth $S_{vk}$ of 1.5 µm to 4.0 µm.

5. The method according to claim 1,
wherein
the strip is soft-annealed (state "O") or is solution-annealed and quenched (state "T4").

6. The method according to claim 1,
wherein
the strip or sheet has a passivation layer which is applied after the electrochemical graining.

7. The method according to claim 1,
wherein
the average roughness of the surface $S_a$ is 0.7 µm to 1.5 µm.

8. The method according to claim 3, further comprising producing one or more sheets by cutting the strip to size.

9. A method for producing a strip or a sheet having a one or two-sided surface structure which is prepared for an adhesive connection in motor vehicles, wherein a hot- and/or cold-rolled strip or sheet is subjected to electrochemical graining after the rolling, wherein homogenously distributed depressions are at least in certain areas introduced into the strip or sheet by the electrochemical graining and the strip or sheet comprises an aluminium alloy of the type AA7xxx, type AA6xxx, type AA5xxx or of the type AA3xxx, wherein depressions with a reduced valley depth $S_{vk}$ of 1.0 µm to 6.0 µm are at least in certain areas introduced into the strip or sheet surface by the electrochemical graining.

10. The method according to claim 9,
wherein
strip or sheet is subjected to a cleaning step before the electrochemical graining, in which the surface is cleaned by alkaline or acid pickling and a homogenous removal of material is carried out.

11. The method according to claim 9,
wherein
the electrochemical graining is carried out using $HNO_3$ in a concentration of 2.5 to 20 g/l with a charge carrier input of at least 200 $C/dm^2$.

12. The method according to claim 9,
wherein
after the electrochemical graining, a passivation of the surface is carried out.

13. The method according to claim 9,
wherein
a strip is electrochemically grained after soft annealing (state "O") or after solution annealing and quenching (state "T4").

14. The method according to claim 12,
wherein
the method steps are carried out in-line on a production line:
uncoiling the strip from a coiler:
cleaning and pickling the strip;
at least in certain areas electrochemically graining the strip; and
at least in certain areas applying a forming aid and/or a conversion layer or applying a protective oil.

15. An adhesive connection in a motor vehicle, between at least two join partners, wherein at least one join partner is a sheet according to claim 8 and the adhesive connection is provided in at least one area of the sheet which has a surface structure produced by electrochemical graining.

16. A strip or sheet consisting of an aluminium alloy for a utilizing according to the method of claim 1,
wherein
the strip or sheet consists of an aluminium alloy of the type AA7xxx, type AA6xxx, type AA5xxx or of the type AA3xxx, the strip or sheet at least in certain areas has a surface structure prepared for an adhesive connection, wherein the surface structure has depressions which were produced using an electrochemical graining process, the surface structure which is at least provided in certain areas is provided on at least one or on both sides of the strip and has a reduced valley depth $S_{vk}$ of 1.0 µm to 6.0 µm.

17. The method according to claim 1, wherein the strip comprises an aluminium alloy of the type AA7020, AA7021, AA7108, AA6111, AA6060, AA6014, AA6016, AA6005C, AA6451, AA5454, AA5754, AA5182, AA5251, AlMg6, AA3104, or AA3103.

18. The method according to claim 3, wherein the sheets are for structural applications of motor vehicles.

19. The method according to claim 4, wherein the reduced valley depth $S_{vk}$ is from 2.2 µm to 4.0 µm.

20. The method according to claim 1, wherein the average roughness of the surface $S_a$ is 0.7 µm to 1.3 µm.

21. The method according to claim 1, the average roughness of the surface $S_a$ is 0.8 µm to 1.2 µm.

22. The method according to claim 9, wherein the strip or sheet comprises an aluminium alloy of the type AA7020, AA7021, AA7108, AA6111, AA6060, AA6014, AA6016, AA6005C, AA6451, AA5454, AA5754, AA5182, AA5251 AlMg6, AA3104, or AA3103.

23. The method according to claim 9, wherein the reduced valley depth $S_{vk}$ is from 1.5 μm to 4.0 μm.

24. The method according to claim 23, wherein the reduced valley depth $S_{vk}$ is from 2.2 μm to 4.0 μm.

25. The method according to claim 11, wherein the charge carrier input is at least 500 C/dm$^2$.

26. The method of claim 12, wherein the passivation of the surface is carried out by applying a conversion layer.

27. The strip or sheet of claim 16, wherein the reduced valley depth $S_{vk}$ is from 1.5 μm to 4.0 μm.

28. The strip or sheet of claim 16, wherein the reduced valley depth $S_{vk}$ is from 2.2 μm to 4.0 μm.

\* \* \* \* \*